United States Patent
Tang et al.

(10) Patent No.: US 9,725,640 B2
(45) Date of Patent: Aug. 8, 2017

(54) SUBMICRON PARTICLES SURFACTANT METHOD FOR IMPROVED OIL RECOVERY FROM SUBTERRANEAN RESERVOIRS

(71) Applicants: Hongxin Tang, Walnut, CA (US); Zayne Hai Lu, Arcadia, CA (US)

(72) Inventors: Hongxin Tang, Walnut, CA (US); Zayne Hai Lu, Arcadia, CA (US)

(73) Assignee: ChemEOR, Inc., Covina, CA (US)

( * ) Notice: Subject to any disclaimer, the term of this patent is extended or adjusted under 35 U.S.C. 154(b) by 52 days.

(21) Appl. No.: 13/986,229

(22) Filed: Apr. 12, 2013

(65) Prior Publication Data
US 2014/0305649 A1 Oct. 16, 2014

Related U.S. Application Data

(60) Provisional application No. 61/623,205, filed on Apr. 12, 2012, provisional application No. 61/652,999, filed on May 30, 2012.

(51) Int. Cl.
- *C09K 8/70* (2006.01)
- *C09K 8/584* (2006.01)
- *C09K 8/60* (2006.01)

(52) U.S. Cl.
CPC ............. *C09K 8/70* (2013.01); *C09K 8/584* (2013.01); *C09K 8/602* (2013.01); *C09K 2208/10* (2013.01)

(58) Field of Classification Search
CPC ............................ C09K 8/604; C09K 2208/10
USPC ...................................................... 166/308.2
See application file for complete search history.

(56) References Cited

U.S. PATENT DOCUMENTS

| | | | |
|---|---|---|---|
| 4,961,790 A | 10/1990 | Smith | |
| 5,373,901 A | 12/1994 | Norman | |
| 5,783,541 A | 7/1998 | Tack et al. | |
| 6,444,316 B1 | 9/2002 | Reddy et al. | |
| 6,527,051 B1 | 3/2003 | Reddy et al. | |
| 6,554,071 B1 | 4/2003 | Reddy et al. | |
| 7,156,174 B2 | 1/2007 | Roddy et al. | |
| 7,204,312 B2 | 4/2007 | Roddy et al. | |
| 8,146,666 B2 * | 4/2012 | Tang ...................... | C09K 8/584 166/279 |

(Continued)

FOREIGN PATENT DOCUMENTS

| | | |
|---|---|---|
| EP | 1591619 A1 | 11/2005 |
| GB | 238717 A | 2/2003 |

(Continued)

OTHER PUBLICATIONS

Hosokawa M. et al. ed.; Chapter 1: Basic Properties and Measuring Methods of Nanoparticles; Nanoparticle Technology Handbook, 1st ed.; 2007; pp. 20-23; Elsevier.

(Continued)

*Primary Examiner* — Doug Hutton, Jr.
*Assistant Examiner* — Ashish Varma
(74) *Attorney, Agent, or Firm* — Panqing He; John S. Reid

(57) ABSTRACT

Methods of stimulating a well comprising providing a stimulation fluid comprising at least one surfactant and submicron particles, the submicron particles having a particle size between about 200 nm and about 800 nm and a specific surface area greater than about 5 square meters per gram; and introducing the stimulation fluid into a wellbore. Additional methods to enhance oil recovery from subterranean reservoirs accessible via a well are described.

29 Claims, 1 Drawing Sheet

(56) References Cited

U.S. PATENT DOCUMENTS

| | | | |
|---|---|---|---|
| 8,278,251 B2 | 10/2012 | Huang | |
| 9,080,097 B2* | 7/2015 | Gupta | C09K 8/665 |
| 2009/0082230 A1 | 3/2009 | Javora | |
| 2009/0260819 A1* | 10/2009 | Kurian et al. | 166/292 |
| 2010/0096139 A1* | 4/2010 | Holcomb | C09K 8/536 |
| | | | 166/308.1 |
| 2012/0048548 A1 | 3/2012 | Crews | |
| 2012/0178651 A1 | 7/2012 | Huang | |
| 2012/0181019 A1 | 7/2012 | Saini | |
| 2012/0211227 A1* | 8/2012 | Thaemlitz | C04B 20/008 |
| | | | 166/279 |
| 2012/0255887 A1 | 10/2012 | Holms | |
| 2012/0283155 A1 | 11/2012 | Huang et al. | |

FOREIGN PATENT DOCUMENTS

| | | |
|---|---|---|
| WO | WO 2009/142844 A1 | 11/2009 |
| WO | WO 2011/149618 A1 | 12/2011 |
| WO | WO 2011/159472 A2 | 12/2011 |
| WO | WO 2012/009128 A2 | 1/2012 |
| WO | WO 2012/071462 A1 | 5/2012 |

OTHER PUBLICATIONS

Wu, J. et al.; Effect of Nanoparticles on Oil-Water Flow in a Confined Nanochannel; 2012; pp. 1-2; SPE.156995; Society of Petroleum Engineers.

Alaskar M. et al.; Nanoparticle and Microparticle Flow in Porous and Fractured Media; 2012; pp. 164-66; SPE 146752; Society of Petroleum Engineers.

Rodriguez, E. et al.; Enhanced Migration of Surface-Treated Nanoparticles in Sedimentary Rocks; 2009; pp. 1, 2, 5, 8; SPE 124418; Society of Petroleum Engineers.

Hoffmann et al.; Silica-Based Mesoporous Organic-Inorganic Hybrid Materials; Angew. Chem. Int. Ed.; 2006; 3216-51; vol, 45; Wiley-VCH Verlag GmbH & KGaA Weinheim.

Perego, C. & Millini, R.; Porous Materials in Catalysis; Chem. Soc. Rev.; 2012 DOI: 10.1039/c2cs35244c; Royal Society of Chemistry.

Alothman, Z.; A Review: Fundamental Aspects on Siliicate Mesoporous Materials; Materials; 2012; 2874-2902; vol. 5; MDIP AG.

* cited by examiner

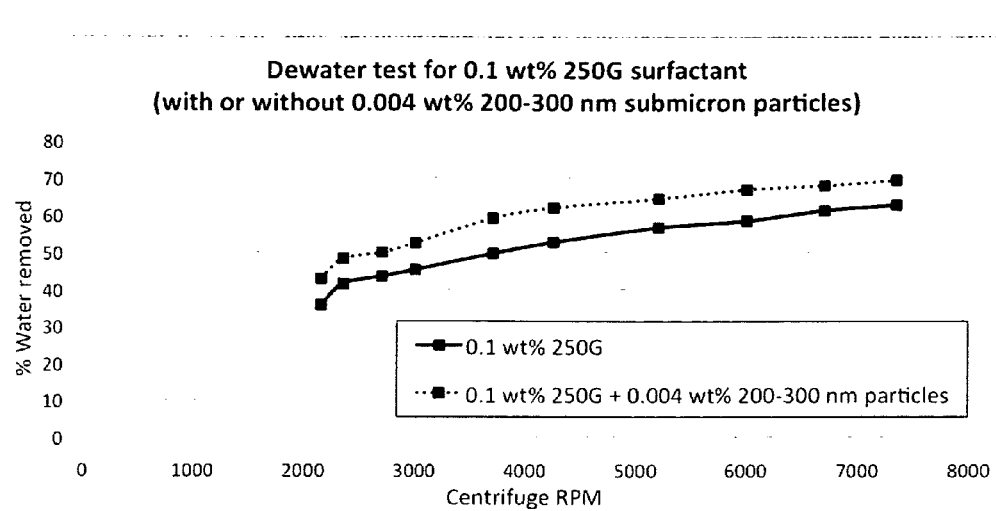

SUBMICRON PARTICLES SURFACTANT METHOD FOR IMPROVED OIL RECOVERY FROM SUBTERRANEAN RESERVOIRS

CROSS-REFERENCE TO RELATED APPLICATIONS

This application claims the benefit of U.S. Provisional Application No. 61/623,205, filed Apr. 12, 2012, and U.S. Provisional Application No. 61/652,999, filed Can 30, 2012, which are hereby incorporated by reference herein.

FIELD AND BACKGROUND

The methods herein relate generally to the field of crude oil or natural gas production from a subterranean formation by a well, and particularly to methods to increase recovery of crude oil and natural gas production from such a well using fluids comprising small particles in the submicron size range. "Subterranean formation" refers to a fundamental unit of lithostraitigraphy; it is a body of rock that is sufficiently distinctive and continuous that it can be mapped. A "reservoir" is a subterranean formation containing oil or gas; it is in a shape that will trap hydrocarbons and is covered by a relatively impermeable rock, known as a cap rock. As used herein, a "well" includes at least one wellbore, and can include a near-wellbore region of the formation that surrounds and is in fluid communication with the wellbore.

The general process of producing oil and gas by way of a well and the various well fluids used therein are described in the art, for example in U.S. Appl. 2012/0181029, which is incorporated by reference. Broadly speaking, producing hydrocarbons by means of a well includes as major stages drilling, perforating and completing, and (the actual) producing, where the last stage, producing, corresponds to or coincides with, or can even be directly termed, well intervention. Well intervention generally includes any operation carried out on a well during or at the end of its productive life that alters the state of the well or well geometry, provides well diagnostics, or manages the production of the well.

Drilling, completion, and intervention operations each can include various types of treatments that are commonly performed on a well or subterranean formation. Some treatments, for example fluid-loss control, can be used during any of drilling, completion, and intervention operations. While stimulation is a type of treatment performed during completion or intervention to enhance or restore the productivity of oil and gas from a well, and can fall into two main groups, hydraulic fracturing and matrix treatments, depending on whether the fracture pressure is above or below that the subterranean formation. There are other types of completion or intervention treatments, including for example gravel packing, consolidation, and control of excessive water production.

Treatments therefore constitute a dimension or array of operations that are orthogonal to the main phases of drilling, completion, and intervention in hydrocarbon production. They are related to these main stages, but are also independent in that they can be introduced during or between any of these stages to serve a particular related purpose or to enhance the basic purpose of each stage. A treatment thus is used for changing a condition of a wellbore or any adjacent subterranean formation. Non-limiting examples of treatments include fluid-loss control, isolation, stimulation, or conformance control.

Additionally, achieving a viscosity increase in a base liquid, usually water, is often useful in oil and gas production and recovery by way of a well. This is usually brought about by adding a viscosity-increasing agent to the base liquid or by emulsification. Increased viscosity prevents particulates with a different specific gravity than an external phase of the fluid system from quickly separating out of the external phase. Water-soluble polysaccharides and derivatives such as guar, cellulose, xanthan, scleroglucan, and their derivatives, when added can exist in a non-crosslinked or crosslinked form, and in the latter case can form a gel with the whole fluid; as a class of useful viscosity-increasing agents, they can improve the ability of the fluid system to suspend and carry particulate material, but can also be used for other purposes as, for example, friction reducers. It is to be noted that the flow of substances that have a complex structure, such as muds, sludges, suspensions, gels, etc., cannot be characterized by a single value of viscosity, which varies with temperature, pressure, and other factors. Altering—increasing, or in some instances "breaking"—the viscosity is often carried out for drilling and completion fluids, but can or can not be required or desirable for fluids used in particular treatment operations.

BRIEF DESCRIPTIONS OF THE DRAWINGS

FIG. 1 is a graph comparing dewatering performance between two dispersions, comprising respectively a surfactant formulation only and the same surfactant formulation plus submicron particles at a low concentration.

DETAILED DESCRIPTION

General Definitions and Usages

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," "between about a and about b," and any similar expressions, where "a" and "b" represent numerical values of degree or measurement) is to be understood to set forth every number and range encompassed within the broader range of values.

Terms such as "first", "second," "third," etc. are assigned arbitrarily and are merely intended to differentiate between two or more components, parts, or steps that are similar or corresponding in nature, structure or function, or action. For example, the words "first" and "second" serve no other purpose and are not part of the name or description of the following name or descriptive terms. Further, the mere use of the term "first" does not require that there be any "second" similar or corresponding component, part, or step. Similarly, the mere use of the word "second" does not require that there be any "first" or "third" similar or corresponding component, part, or step.

When either surfactants or submicron particles are each dispersed into an aqueous based fluid, which occasionally contains a small amount of hydrocarbons, a dispersion can be formed. Terms such as "small particles surfactant dispersion" and "submicron particles surfactant dispersion" can refer to any of the following states: where a surfactant dispersion and a particles dispersion have simply been combined into one, or where a surfactant dispersion is serving as a carrier fluid or diluent for particles dispersed into it, or where a particles dispersion is serving as a carrier fluid or diluent for one or more surfactants dispersed into it.

Particles in the Nanometer and Submicron Range

In the field of crude oil or natural gas production and recovery from a well taken as a whole, there exist wide-ranging applications using small particles in the nanometer and submicron particle size range. The various particular size delimitations made use of therein are established based upon specific purposes.

In a thorough treatment of nanoparticle technology, Hosokawa et al. state in "Nanoparticle Technology Handbook" (2007, Elsevier, p. 5) that "the definition of nanoparticles differs depending upon the materials, fields and applications concerned. In the narrower sense, they are regarded as the particles smaller than 10-20 nm, where the physical properties of solid materials themselves would drastically change. On the other hand, the particles in the three digit range of nanometer from 1 nm to 1 µm could be called as [sic] nanoparticles. In many cases, the particles from 1 to 100 nm are generally called as [sic] nanoparticles, but here they will be regarded as the particles smaller than those called conventionally 'submicron particles', and concretely less than the wavelength of visible light (its lower limit is about 400 nm) as a measure, which need to be treated differently from the submicron particles."

It is apparent that physical properties of bulk materials drastically change when their particle size is 10-20 nm or less, this change being the basis of most nanotechnology applications. In this sense, very strictly speaking, nanoparticles are particles less than about 10-20 nm. However, in a very broad and general sense, referring to particles in the broad range of 1-1000 nm as nanoparticles is also conceded in the specialist literature. But more practically, either 1-100 nm or 1-400 nm is probably the most useful particle size delimitation range for a wide variety of nanotechnology applications, and by implication, either 100-1000 nm or 400-1000 nm the most useful to delimit the submicron particle size range.

As used herein, submicron particles are those in the 100-1000 nm particle size range. As such, their particle sizes can overlap with those of nanoparticles when nanoparticles are broadly construed. Thus to determine whether two pieces of art overlap with respect to particle size, there is a need to inspect and compare specific cited size values, rather than relying on descriptions such as "submicron particles" or "nanoparticles," which however provide convenient, rough indications of size values. Of equal relevance, however, Hosokawa et al. also support treating submicron particles as a different category, or type, than nanoparticles, and considering the two groups as broadly distinguishable.

The Use of Small Particles in the Nanometer and Submicron Ranges in the Art

Small particles in the nano and submicron ranges can increase oil recovery by improving either the properties of the injected fluid (e.g., viscosity enhancement, density, surface tension reduction, emulsification improvement, and thermal conductivity and specific heat improvements), or properties of the fluid-porous media interaction (e.g., wettability alteration and heat transfer coefficient), or both.

Thus a wide range of applications making use of small particles in the nanometer and submicron range are found in the field of crude oil or natural gas production and recovery from a well. Not all of them, however, are related particularly to the present methods and their embodiments. Because nano- and related small particles technology applications in the field of hydrocarbon production developed somewhat recently, and the relationships among the applications not relatively well defined, a range of examples are enumerated below.

WO2009142844 describes methods of fluid control in a subterranean formation by introducing a slurry containing nanoparticles having a mean particle size between 4 and 2000 nm. U.S. Appl. 2012/0211227 discloses the use of nanoparticles in the 1-1000 nm range in cement compositions and completion fluids; in the same reference, the next narrower size range claimed is 1-100 nm. U.S. Appl. 2012/0048548 describes the use of a class of sheet silicate minerals, phyllosilicates, in the 1-1000 nm range to enhance viscosity in viscoelastic surfactant (VES) fluids. WO2012009128 discloses the use of nanoparticles having a size less than 999 nm in drilling and completion fluids, where the next narrower size range claimed is of particles having at least one dimension less than 100 nm. WO2011159472 describes methods of using nanoparticles of 1000 nm or less, a portion of which is tagged in certain instances, to determine well zonal origin of production and to reduce fines migration. U.S. Appl. 2009/0082230 describes treatment fluids containing an additive with median particle size of less than 1 micron for applications such as drill-in fluid, thermal insulating fluid, spacer, or fluid loss control agent.

These references just described make use of particles below 1 micron or, in one case, 2 microns. However, they are all directed to the drilling or completion phases of the overall hydrocarbon production process. If they are directed to a treatment operation, they are not used for a stimulation operation, nor where the purpose of the injected fluid is to directly contact the porous matrix portion of the reservoir to enhance oil recovery by mechanisms such as interfacial tension (IFT) reduction, wettability alteration, or the like. Specifically, U.S. Appl. 2012/0211227 and WO2012009128 are directed to drilling, cementing, and completion fluids, while WO2009142844, WO2011159472, and U.S. Appl. 2009/0082230 are directed to fluid control, tracing, and various other purposes including thermal insulation, fluid loss control, and the like. And U.S. Appl. 2012/0048548 makes use of nano and submicron particles as viscosity enhancing agents in a VES system, to crack the formation rock during a fracturing operation, reduce fluid leakoff, and carry high loading proppants to maintain the high conductivity of fractures. Viscosity enhancement, as explained above, is directed toward suspending particulates, and not a treatment, intervention, or stimulation operation per se.

References exist in the art that make use of particles closer to the truly nanometer-sized realm for various purposes. These delimit nanoparticles, at the upper end, at either 200 nm or 100 nm. Both GB2378717 and U.S. 2010/0096139 describe the use of nanoparticles to alter wetting or spreading properties on a porous media surface in order to increase hydrocarbon production or recovery from subterranean porous formations. GB2378717 discloses aqueous based fluids that alter wettability index and contain either organic polymeric species, essentially organosilanes, or inorganic salts, both having a particle size of less than about 200 nm. However, GB2378717 does not describe the use of surfactants, and organosilanes are not ordinarily or conventionally considered in the art as surfactants. U.S. Patent Application Publication No. 2010/0096139 describes the use of wetting agents, which are revealed to be surfactants, and nanoparticles in the 1-200 nm range to improve a well's flow capacity, which is achieved through a specific colloidal fluid spreading mechanism, that is, an increase in what is termed structural disjoining pressure.

U.S. Patent Application Publication No. 2012/0181019 teaches the use of nanohybrid-stabilized emulsions to alter the wettability of a surface in a well. These nanohybrids, defined as having one dimension in the order of 100 nm or less, are however no longer nanoparticles, but rather functionalized nanotube materials, which are used for viscosity modifying effects by "switching" (i.e., enhancing or breaking). U.S. Patent Application Publication No. 2012/0178651 is directed to uses of nanoparticles, having a mean particle size of 100 nm or less, for clay stabilization; WO2011149618 is directed to particles having a crystallized size of 100 nm or less for such purposes as shear thinning, transport, lowering of formation damage, and reducing the likelihood of altering the wettability of the formation compared to certain VES fluids, and the like (this reference's teaching on wettability alteration, it is noted, conflicts with that of GB2378717 and Patent Application Publication No. 2010/0096139); and WO2012071462 is directed to a polymer dispersion that uses crosslinking agents, which bear supporting structures possessing one dimension that is at least 1 nm, again for viscosity modifying effects. Finally, Patent Application Publication No. 2012/0255887 is directed towards the non-traditional application of recovering bitumen from tar sands using aqueous fluids containing nanoparticles in the size range of 9 nm to 100 nm.

Notwithstanding the extensive use of small particles in the nano to micron range in different oilfield applications (as described above), we have discovered that applying a properly selected submicron particles surfactant formulation can increase the interaction between an aqueous phase production well treatment fluid and the lower flow conductive portion of rock in a subterranean oil reservoir, as will be further detailed below.

Further Description

Previously in U.S. Pat. No. 8,146,666, the use of surfactant formulations in processes that enhance oil recovery from a subterranean reservoir was disclosed. We have discovered that adding submicron particles to surfactants and/or surfactant dispersions further improves upon the recovery effect.

Mechanisms of chemical, alkaline, surfactant, or polymer flooding techniques fall into three basic categories, namely IFT reduction, wettability alteration, and mobility control. Methods to measure and evaluate the bulk properties IFT and wettability are well established in the petroleum industry. GB2378717, for example, relies on the Amott-Harvey wettability index to describe the wettability alteration brought about by nanoparticles in its aqueous based formulations. On the other hand, Patent Application Publication No. 2010/0096139 uses Derjaguin's concept of disjoining pressure, a thickness-dependent thermodynamic description of interaction between two surfaces, to describe how nanoparticles contribute to the spreading behavior of micellar fluids. In the mechanism classification outlined above, this concept would fall under "mobility control," although it also alludes to the aspect of work done per unit area of IFT and wettability.

How small particles, especially nanoparticles, alter aqueous solutions or water/oil systems, how they are transported through porous media, and what possible mechanisms can explain these alterations and behaviors are briefly described in Wu et al. (2012, Society of Petroleum Engineers, paper SPE 156995, pp. 1-2). As respects mechanisms, many details remain unknown, and better explanations await further experimentation and theoretical development. This is even more the case when it comes to the interaction between small particles and surfactants, and how a system containing both behaves as it is transported through the geological system of a hydrocarbon-containing reservoir.

All oil reservoirs have a complex geology where there is a substantial variation in the types and physical characteristics of rocks and their ability to conduct flow (i.e., their permeability). These variations in flow conductivity are due to the many unconformities and imperfections such as voids, cracks, and fractures within and between the rock types that are present in all oil reservoir geologic systems. This means there are many boundaries between high and low permeability features.

Although a very detailed mechanism is lacking, a qualitative description of how a submicron particles surfactant dispersion functions to mobilize hydrocarbon recovery can be given as follows. Aqueous-based well treatment solutions containing a properly selected surfactant and/or surfactant dispersions and submicron particles will enter first preferentially into the oil reservoir via the high permeability paths. The submicron particles surfactant dispersion increases the water-wetting of the surfaces of the lower permeability rock types and thereby induces the aqueous-phase to penetrate (imbibe) faster and deeper than otherwise (i.e., than the water only case and the surfactant only case) into these lower permeability, more flow restricted reservoir rocks. This imbibition or wicking action by the aqueous phase of the submicron particles-containing surfactant dispersion into the tighter rock matrix pushes out oil trapped in place in this lower permeability rock. The released oil then is forced into the adjacent higher capacity flow channels, and this oil can then be caused to move to the treated well by an aqueous flush or the like, or in the case of hydraulic fracturing, directly produced.

Such a submicron particles surfactant dispersion can be beneficially applied with other well servicing or treatment fluids, that is, if the particular submicron particles surfactant dispersion to accelerate imbibition is added directly to another well servicing or stimulation fluid, as well as if the submicron particles surfactant dispersion is applied into a well by itself, before or after a different well stimulation treatment, and preferably within less than about six months of one another.

To not plug pores of the porous matrix when introduced into subterranean formations has been considered an advantage in using dispersions or solutions containing nano-sized particles in oil or gas recovery operations. Moreover, larger particles that cannot be transported through matrix pores or channels would be unable to exert influence by any of several mechanisms, for example wettability alteration, to improve oil or gas recovery or treat other problems in hydrocarbon extraction. Many references in the art support this concept. As an example, U.S. Appl. 2012/0283155 limits the use of nanoparticles to those having a mean particle size of 100 nm or less to control coal fines, and points out that such nano-sized additives, being much smaller than the pores, pore throat passages, and fractures and passages within a coal bed, are non-pore plugging.

More explicitly, Alaskar et al. (2012, Society of Petroleum Engineers, paper SPE 146752, pp. 1164-66) showed, using Sn—Bi alloy particles of a wide size distribution, from 50 nm to 600 nm, that only particles with diameters of 200 nm or smaller were transported within the pore spaces of Berea sandstone cores (mean pore size 10 µm, gas permeability~152 mD, and porosity~18%). The Sn—Bi particles were selected due to their temperature sensitivity, for potential use as temperature sensors. Other than that, they were similar (for example in surface charge and shape) to $SiO_2$ nanoparticles the practitioners previously used, excepting the Sn—Bi particles' wide size distribution, which was employed specifically to test the effect of particle size. This research would question the use of particles larger than about 200 nm to bring about improvements in hydrocarbon recovery from reservoir rocks of the same type as those used by the practitioners, let alone those of a smaller pore size or lower permeability.

It is also known that small particles from the nanometer to micron range form aggregates when in dispersion. Larger particles or aggregates in this size range, i.e., those closer to submicron and micron in size, do not migrate and transport through fine pores easily. For instance, Rodriguez et al. (2009, Society of Petroleum Engineers, paper SPE 124418, p. 1) point out that "nano-sized devices and agents will be solid aggregates, and the transport of colloidal dispersions (length scale between 100 nm and 10,000 nm) in reservoir rock is known to be very difficult." They found that nanoparticles, defined by them as objects with a length scale between 1 and 100 nm, adsorbed reversibly to pore walls when migrating through pore channels. Larger colloidal particles (100 nm-10 µm) they pointed out, however, would be retained by a "straining and filtration" retention mechanism (Rodriguez, 2009, pp. 2, 5, and 8). This teaching again disfavors using dispersions containing particles greater than about 100 nm to contact a reservoir matrix to improve oil or gas recovery.

Reference WO2011149618, described above, also teaches that using nanoparticles having a crystallized size of 100 nm or less will reduce the likelihood of altering the wettability of the formation compared to certain VES fluids.

Alaskar et al. (2012, SPE 146752, p. 1165) further reported that they previously used spherical $SiO_2$ nanoparticles, of a narrow size distribution and a surface charge compatible to that of the rock, which were transported successfully through the pore spaces of Berea sandstone. Comparing their two studies, they thus concluded that a dispersion containing polydisperse particles plugged cores more easily. U.S. Appl. 2010/0096139 also teaches that high polydispersity results in a decreased value of the structural disjoining pressure, and that according to calculations, a 20% polydispersity in particle size can result in a 30% decrease in the structural disjoining pressure. Therefore due to either core plugging or decreased disjoining pressure, these teachings cast doubt on the effectiveness of introducing a highly polydisperse small particles dispersion into a subterranean reservoir to improve hydrocarbon recovery.

Notwithstanding such clear teachings concerning the ineffectiveness and disadvantages of using particles larger than 200 nm, we have discovered that using submicron particles greater than 200 nm in a surfactant dispersion is effective in improving hydrocarbon recovery from porous rock media commonly encountered in subterranean reservoirs. This recovery rate, as will be shown in examples below, is greater than when a dispersion containing surfactants alone or submicron particles alone is used. Further, as the examples will show, submicron particles of a highly polydisperse characteristic can be used effectively. There is no particular limitation in the embodiments that submicron particles of low polydispersity or high monodispersity be used, but they are not excluded and can be used.

A particular advantage of using particles in the submicron range in hydrocarbon recovery operations, compared to those in the nanometer range, and of placing no monodispersity requirement, is cost competitiveness. Nanoparticles are manufactured by means of among others attrition, pyrolysis, vaporization by thermal plasma (including induction plasma) followed by rapid cooling or condensation, and radiolysis. Some of these methods, especially for making nanoparticles for use in the semiconductor industry, for example, are expensive; the smaller the particle, and the tighter the requirement for monodispersity, the more expensive. Oil and gas recovery operations, especially those making use of hydraulic fracturing methods, use very large quantities of carrier fluids (mostly aqueous based). Maintaining a particular effective particle concentration in these operations requires using a correspondingly large absolute quantity of particles. Therefore, using less expensive polydisperse submicron particles that can be successfully transported through the pores of the reservoir matrix to induce improved hydrocarbon recovery provides an economic benefit.

In a first embodiment of a method described herein, a stimulation fluid comprising submicron particles and at least one surfactant is provided or formed, and injected into a wellbore. The submicron particles in this stimulation fluid have a particle size between about 200 nm and about 800 nm and a specific surface area greater than about 5 square meters per gram. Although specific surface area is related to particle size, it is not a superfluous feature when additionally specified, since it can be predicted from particle size only on assumption of an ideal particle model, i.e., where a sample contains particles of regular shape and one size. In that case, $S=6/(\rho*l)$, where S is the specific surface area, $\rho$ the true density of a particle, and l the side length of a unit cube if the particles were unit cubes composing a larger sample cube; if the particles were spherical, the equation can be corrected by an appropriate shape factor.

For real samples consisting of particles with irregular shapes of a size distribution, specific surface area must be measured by adsorption methods based on the Brunauer-Emmett-Teller (BET) theory or modifications and variations thereof. Details on these matters are described in Hosokawa et al, "Nanoparticle Technology Handbook," 2007, Elsevier, pp. 20-23. Specific surface area as it relates to the processes described herein cannot be derived from particle size and true particle density alone (sometimes for the reason that a true particle density cannot be determined accurately), absent further assumptions or corrections, hence is a non-redundant limitation beyond particle size; it is rather generally a measured empirical value, and usually provided by industrial suppliers who determine it using standard BET or other methods.

Disclosed herein is another non-limiting embodiment, used to enhance oil recovery from a subterranean reservoir wherein, from a well that accesses the reservoir, a submicron particles surfactant dispersion and a well-servicing volumetric solution are injected into the well within less than about six months of one another. The dispersion comprises both submicron particles, which are between about 200 nm and about 800 nm in size and greater than about 5 square meters per gram in specific surface area, and one or more surfactants, and is suitably selected to increase the oil-to-water ratio of oil recovery from a porous matrix portion of the reservoir. This dispersion can be termed the EOR, short for enhanced oil recovery, dispersion or EOR treatment, or in similar ways, as it can be employed in an analogous fashion as a surfactant (only) enhanced oil recovery "huff-puff" operation. The term "enhanced oil recovery" or "EOR" as used herein and elsewhere, unless explicitly noted otherwise or clearly indicated by context, is however non-restrictive and not limited to the so called tertiary recovery processes (see further details below).

The well-servicing volumetric solution, on the other hand, is chosen to perform a second, i.e., distinct, well treatment process, which can include, but is not limited to, a scale inhibitor squeeze, a well acidizing or acid stimulation, injecting other stimulation fluids (e.g. organic solvents to remove wax/asphaltenes), injecting polymer gels or other fluids to reduce the production rate of water, injecting carbon dioxide to stimulate oil production at either a production or an injection well, and injecting fluids for purposes of inducing cracks to improve fluid production flow (commonly known as hydraulic fracturing). (When this last process includes injection steps with an acid solution, this treatment is referred to as acid-fracturing.) This other common oil field treatment process can also include placing chemicals or materials near a production wellbore for purposes of reducing the rate of water production.

In a preferred embodiment, the dispersion and the volumetric solution are injected within less than about 30 days of one another. Either interval qualification, that is, within about six months or 30 days, includes the circumstance wherein the dispersion and the volumetric solution can be simultaneously injected or introduced.

As to the well through which hydrocarbon recovery operations are conducted, there exist at least two types, depending on whether operations are conducted during what are termed a primary, secondary, or tertiary recovery process. During primary recovery, when the hydrocarbon-to-water ratio is high, intervention and treatment fluids are injected into, and oil and/or gas are produced from the same well, termed the production well. While during secondary and tertiary recovery processes, when the hydrocarbon-to-water ratio has decreased to a certain extent, water or any intervention, treatment, or servicing fluids are sometimes, though not always, injected into a separately drilled injection or servicing well, which is some distance away from the production well though connected to it via the subterranean reservoir, as both are in fluid communication with the reservoir. Frequently such an injection well services several production wells. During secondary and tertiary recovery processes, oil and gas production continues to come from the production well. Thus while oil and/or gas is always produced from a production well, treatment, intervention, and servicing fluids employed to treat particular conditions or problems that occur during the recovery process, or to improve recovery, can be injected into either the same production well or a separate injection well.

As the methods and processes disclosed herein are not limited in any way as to whether they can be applied during primary, secondary, or tertiary recovery operations, so the well through which any injection takes place will be one that is appropriate depending on context. Specifically, as relating to these methods and processes disclosed herein, a "well" when used such that it is being injected with or receiving materials, such as a dispersion, a well-servicing volumetric solution, a stimulation fluid, a fracturing compound, a well treatment process, dry treatment additives, a dry mixture, or the like, can be either a production well or an injection well. But when a "well" is producing, being halted from production, or being returned to production, or the like, then it will be clear that it is from a production well only; however, a case where an injection well can be turned into a production well is not excluded. A skilled practitioner in the filed will readily be able to discern the type of well that is being specified from context, based on the teachings herein, even when encountering a phrase where "well" is not immediately further modified or defined. In the method just described above, for example, where a dispersion and a volumetric solution are injected into a well through which a subterranean reservoir is made accessible, it will be readily apparent to one skilled in the art that the "well" mentioned can be either an injection well or a production well.

In the present embodiments, the surfactant portion of the particles surfactant dispersion is preferably selected having a characteristic that is capable of altering the wettability of the matrix rock to be more water-wet. The wettability-altering agent is a composition from a class of compounds commonly known as surfactants. Surfactants generally have a hydrophilic and a lipophilic character, which varies as a function of the surfactant composition as well as the nature of the formation rock and connate fluids that the surfactant contacts. Combining submicron particles with one or more surfactants enhances the wettability-altering ability of the surfactants, and creates a particles surfactant dispersion.

The particles surfactant dispersion-containing stimulation fluid or EOR dispersion is further defined by any of several properties, including (a) the ability to lower an oil and water interfacial tension between oil and water in the reservoir; (c) the ability to enhance a mobility or a spreading of hydrocarbons out of the porous matrix portion of the reservoir; or (c) to enhance compatibility with chemicals in other well treatment processes that can be performed on the well.

As for the one or more surfactants that are components in the stimulation fluid or EOR dispersion, they are not limited to any particular ones in embodiments described herein, but preferably the surfactant satisfies the above stated criteria. A preferred surfactant for use in accordance with the present disclosure is one that achieves a substantially neutral balance between its hydrophilic and lipophilic character within the given formation in which the surfactant is placed. Exemplary types of anionic and nonionic surfactants or their mixtures which have particular utility in the present embodiments include ethoxylated alkylphenols, ethoxysulfate alkylphenols, ethoxylated alcohols, ethoxysulfate alcohols, ethoxylated amines, ethoxylated amides, alpha olefin sulfonates, internal olefin sulfonates, alkyl aryl sulfonates, petroleum sulfonates, propoxylated ethoxylated alcohols, propoxylated ethoxylated sulfates, propoxylated ethoxylated sulfonates, propoxylated ethoxylated amines, propoxylated ethoxylated amides, and alkyl polyglycosides.

Another class of surface-active agents that are advantageously useful in carrying out the methods described herein are amine salts, ammonium salts, and others of a similar type of cationic surfactants, either alone or mixed with other types of surfactants. Exemplary of these compounds include primary amines; some commercial cationic surfactants (examples include Arquad T-50 (Trimethyl tallowalkyl ($C_{16}$-$C_{18}$) ammonium chloride) and Arquad C-50 (Coconut oil alkyl ($C_{12}$-$C_{14}$) trimethylammonium chloride, available from Akzo Nobel). The surfactants can be manufactured by synthetic means, or via biosynthesis. Exemplary of the biosurfactants include, but are not limited to, glycolipid or lipopeptide types, for example rhamnolipids produced from *Pseudomonas* and related strains, or surfactin produced from *Bacillus* and related strains.

The surfactant portion of the particles surfactant dispersion can be prepared by mixing the selected surfactant in a diluent. The concentration of the surfactant in the diluent is desirably greater than about 0.01% by weight. The surfactant concentration is desirably between about 0.1% and 4.0% by weight. The concentration is most desirably between about 0.1% and about 1.0% by weight. Brine generally has a total dissolved solids concentration above 1000 ppm, while fresh water has a total dissolved solids concentration below about 1000 ppm.

After being combined with submicron particles and usually further diluted, the volume of the stimulation fluid or EOR dispersion that is injected as a slug into the formation depends on which one of several embodiments encompassed within the present disclosure is being practiced. A number of variations in the processes disclosed herein can be used, depending on which well treatment processes are employed and the specific sequence in which they are employed. Generally, a useful particles surfactant treatment volume is between 100 and 50,000 barrels (each barrel contains 42 gallons). The particles surfactant treatment volume is most desirably between about 500 and about 10,000 barrels.

The particles surfactant slug injected into the reservoir can be preceded by (or followed by) a spacer slug volume of a fluid such as a non-damaging, inert brine (e.g. 3 wt % potassium or ammonium chloride). If the spacer slug is employed, a typical size of the spacer slug is at least the volume of the wellbore; the spacer slug can be a larger volume if it is preferred to minimize the interaction in situ between the fluid in the first process, the particles surfactant stimulation or EOR treatment, and the fluids and chemical from the second process. If instead there is a preference to encourage mixing of the fluids in situ to take advantage of a synergistic effect, then the spacer slug is not used, or its volume is kept small.

After the particles surfactant dispersion and optional spacer slug injection steps are completed, the well can be shut in for some period of time to allow the particles surfactant dispersion to imbibe into the matrix rock, and thereby displace a significant volume of oil into the fracture system. The shut in time is optional, and if included, can be from a few hours to 100 days or more. Typically, the shut in time period, if employed, is from between about 2 to 10 days.

The second, "other" well treatment process (typically, a well-servicing volumetric solution) is implemented either just after, or just before, the particles surfactant EOR or stimulation treatment process (subject to inclusion of a spacer slug, as indicated above). Preferably, but by no means exclusively, the second well treatment program is performed after the particles surfactant EOR/stimulation fluid soak period. The second well treatment process can be carried out with the same chemical design and injection procedures as has been conducted previously in production wells accessing subterranean reservoirs and formations that have not ever employed a particles surfactant EOR/stimulation treatment.

In a further embodiment, the particles surfactant EOR/stimulation chemical is combined intimately with the fluids used in the other, second type of well treatment process, which is typically a well-servicing volumetric solution. The combining can be accomplished previous to the introduction of fluids associated with the two processes, or done at the time of their introduction. This modified chemical mixture can be used to recover more oil than otherwise would result from individual treatment using the two treatments separately, as the particles surfactant dispersion included in the mixture provides an enhanced wetting condition for the porous matrix in the area of the fractures. The other intended purpose(s) of the second combined treatment fluid remain the same (e.g. apply a scale inhibitor, remove formation damage, reduce water production, create more fractures, etc.).

In light of the above disclosure, those skilled in the art will understand how to create such a combined chemical solution that will include a suitable particles surfactant dispersion for altering the wettability of the contacted matrix portion, plus still perform the other intended treatment function, and in addition, create an initially formulated system wherein all of the chemical components are compatible with one another. Advantages to having a single combined treatment fluid include these: (1) the time required to perform both treatment functions is shorter; (2) the logistics of implementing the process in the field is simpler than performing the particles surfactant EOR/stimulation treatment followed by a different well treatment process; (3) there can be synergistic benefits in improving the oil recovery performance of the particles surfactant EOR/stimulation system, than if it is implemented by itself; and (4) there can be the same or even better outcome for the second treatment function than otherwise if implemented by itself.

In further preferred modes of using the methods described herein, the subterranean formation that is in fluid communication with the well can be a fractured reservoir, for example naturally or previously fractured, or can be synthetically fractured by the introduction of a hydraulic fracturing compound. As an example, such a compound can be a proppant-carrying fracturing fluid, which can (or alternately may not) be specially viscosified, that is introduced at a high rate at the top of the well. Preferably the fracturing compound is introduced together, i.e., at the same time, as the stimulation fluid or the dispersion comprising submicron particles and one or more surfactants, such that the fracturing of the subterranean reservoir and the improved hydrocarbon recovery, brought about by the stimulation fluid or dispersion directly contacting the porous matrix portion of the reservoir by one of the mechanisms or properties previously described, can take place at nearly the same time. Such a mode of operating can be more efficient and cost effective than if the introductions were accomplished separately. However, the stimulation fluid/dispersion can be separately introduced before or after the fracturing compound if the practitioner so finds it advantageous.

As discussed above, highly fractured reservoirs consist of two distinct elements: fractures and matrix. The fracture system is a series of interconnected cracks that can transmit fluids easily (very high permeability), but makes up only a small fraction of the total porosity of the reservoir. The matrix portion consists of the oil-bearing porous rock that typically has much lower permeability, but has the bulk of the total porosity of the reservoir. In the case where a hydraulic fracture or acid fracture treatment is performed, fractures are present at least due in part to a man-made activity. The process claimed herein is applicable to natural, as well as man-made (and combinations thereof) fracture systems in oil reservoirs, as well as subterranean reservoirs having matrix permeability resulting from properties other than fractures.

The processes described herein are particularly applicable to formations having matrix blocks where an ordinary water-phase does not have a tendency to imbibe spontaneously into such a rock matrix. Such formations contain matrix blocks where most, if not all, of the rock surface is not water-wet.

While the processes described herein are not limited to formations of a given temperature, the processes are particularly useful in formations having a relatively lower ambient temperature. Thus the processes described herein are particularly applicable to formations having an ambient temperature range from about 20 C to 90 C, and more particularly from about 20 C to about 70 C.

The processes described herein are not limited by the salinity of the formation brine, or the salinity of the make-up water for the particles surfactant dispersion treatment. However, the particles surfactant dispersion to be injected is preferably selected to be compatible with the water in which it is dissolved, the brine in the formation, or with other treatment solutions with which it can be mixed. The particles surfactant dispersion can be considered compatible if the it will dissolve essentially completely into the subject solution and result in no obvious precipitate forming after standing for at least 24 hours. Those skilled in the art can select submicron particles and surfactants and dispersion systems comprising these that will fulfill these criteria. While not a limiting factor, advantageously the processes described herein are conducted in the presence of brine salinities of less than about 250,000 mg/l total dissolved solids, and more advantageously when the salinity is less than about 150,000 mg/l total dissolved solids.

As has been described, a stimulation fluid or dispersion comprising submicron particles and at least one surfactant can be injected into a well as a treatment fluid to improve its performance. (One assessment of performance is an improvement in oil and gas production beyond normal practice.) When injected as such, the particles and the surfactants will usually be present in effective but relatively low concentrations, being diluted by an aqueous base and/or other constituents of the treatment fluid; at this point, the particle concentrations can be from about 0.00004% to about 0.1% by weight, based on the total weight of the treatment fluid dispersion.

Prior to being diluted and injected, the particles can be pre-mixed with an aqueous-based surfactant formulation, providing also a dispersion, in which the particles and the surfactants exist at a relatively higher concentration. The proportion of particles in this dispersion product can be from about 0.1% to about 30% by weight, based on the total weight of the dispersion product, which can be termed a pre-diluted dispersion.

While it is convenient to incorporate the particles into a surfactant system to assemble a dispersion product, a potential concern is that the particles can settle out from the liquid phase of the system due to gravitational force. Generally one wishes to dispense a homogeneous product to constitute well treatment fluids and dilute dispersions, where the proportions of particles and surfactants are constant. This settling effect becomes more pronounced in general as the particle size increases, and when a low viscosity carrier such as water is used. Particle settling would result in dispensing uneven proportions of particles and surfactants.

One surprising observation is that the addition of urea into an aqueous surfactant solution or dispersion can delay or prevent the gravity separation of submicron particles. Urea is a highly soluble salt in water and can replace one half or more of the water portion of the surfactant formulation. Urea also possesses low toxicity. Thus the resulting carrier fluid or diluent maintains its low bulk viscosity and low cost. Preferred modes of using the particle-containing stimulation fluids or surfactant dispersions herein therefore further comprise urea.

Submicron particles can be incorporated by addition to a surfactant formulation dispersion, which can be suitably diluted and constituted with other ingredients, forming a submicron particles-containing stimulation fluid or dispersion, as have been disclosed. These small particles also can be "dry mixed" into other chemical additives that are already handled as dry products. This final dry mixture can be added to any of various fluids that is separately introduced. Such fluids include, but are not limited to, a diluent or carrier fluid of a surfactant, a surfactant or a surfactant formulation, or another treatment fluid distinct from the particles-containing stimulation fluid or dispersion that is to be formed. This other treatment fluid can include, but is not limited to, one for use in hydraulic fracturing, acid fracturing, acidizing, and scale inhibitor squeezes.

The dry mixture, now including the submicron particles, can be introduced according to the usual and standard practice suitable for any or several of its constituents. Upon meeting the separately introduced fluid mentioned above in due course, the particles-containing stimulation fluid or dispersion is formed in situ and introduced.

The oil and gas industry has been evolving towards the use of dry products as additives for well treatment fluids in part to eliminate carrier fluids that have environmental concerns, reduce product costs, and eliminate freezing as an operational concern.

In a non-restrictive embodiment, submicron particles can be dry mixed into or combined with one or more chemical additives that are used in well treatment operations. These include, but are not limited to, friction reducers, polymer thickeners (such as guar gum, modified guar, carboxymethyl cellulose, sesbania, hydroxyethyl cellulose, etc.), proppants (natural or synthetic based), scale inhibitors, biocides, chemicals used to adjust pH, cross-linkers, viscosity breakers, surfactants, and corrosion inhibitors.

The submicron particles include, but are not limited to, at least one particle species selected from aluminosilicate, aluminum oxide, aluminum silicate, lanthanum gallate, lanthanum strontium gallate magnesite, silicon oxide, titanium oxide, zinc oxide, zirconium oxide, carbon materials, graphite, and any combination thereof. Silicon oxide can be of a fumed or pyrogenic silica type.

The submicron particles additionally can include, but are not limited to, at least one particle species selected from cerium oxide, gallium oxide, iron oxide, lanthanum gallium silicate, lanthanum oxide, zinc borate, and any combination thereof.

In a non-limiting embodiment, the submicron particle size ranges between about 200 nanometer (nm) independently up to about 300 nm. In another non-limiting embodiment, the submicron particles have an average specific surface area greater than about 150 square meters per gram.

Further, we have discovered that increased oil production from an oil-bearing reservoir can be achieved by combining a submicron particles surfactant dispersion and a non-surfactant solution to the reservoir within a proximate temporal period to one another (as described above), and wherein the non-surfactant solution is a well-servicing volumetric solution. A well-servicing volumetric solution is a solution configured to increase the volume of fluids that can be produced from a well in communication with the reservoir, and is not intended to increase the production of oil over other fluids in the reservoir. That is, a well-servicing volumetric solution typically essentially only enables higher volumes of fluids to be produced from the well, without regard to whether the fluids contain additional oil or not.

Well-servicing volumetric solutions can include those that acidize or fracture a well or inhibit scales. Put another way, we have discovered that, by combining a submicron particles surfactant dispersion into an oil-bearing reservoir (with the previously expected increase in oil-to-water increase in production as a result thereof), along with a well-servicing volumetric solution (as described above), greater oil recovery can be achieved from the reservoir than if these two fluids were provided to the reservoir in the traditional manner (i.e., using the traditional temporal separation of the two solutions).

In a further embodiment, we have determined that increased oil recovery from an oil-bearing reservoir can be obtained by injecting, into the reservoir, and within a proximate temporal period of one another, a submicron particles surfactant dispersion and a weak acid solution. (Examples of a weak acid include, but are not limited to, carbon dioxide, acetic acid, formic acid, and (weak) hydrochloric acid.)

The methods disclosed herein can further include fracturing the oil reservoir by synthetic means (e.g., hydraulic fracturing) before injecting the stimulation/particles surfactant dispersion into the reservoir.

The present disclosed embodiments can be practiced using submicron particles that have been surface-coated or encapsulated to improve oil recovery. Such coating and encapsulation can facilitate the transportation of submicron particles, or their incorporation into well treatment fluids of various types. Various types of coating or encapsulation are possible, especially for the purpose of ensuring that submicron particles retain their particulate nature and corresponding impact on physical properties of the desired treatment or stimulation fluids. The coating can be of a polymer material, for example polyethylene glycol with a specific number of EG units (for example 7) that is covalently attached to the particle surface through silicon-oxygen-silicon bonds, when the submicron particle is a silica type. The encapsulation can also be within a layer, capsule, or bag.

The encapsulation or coating can be used to facilitate the handling or timed release of the submicron particles. In order to do so, the encapsulating material can, for example, be made of a degradable or biodegradable type, and it can be designed such that the degradation takes place when the encapsulating material comes into contact with another material, for example water. Exemplary water-dissolvable encapsulation materials that can be used to encapsulate small particles of the nano and submicron size are described in U.S. Pat. Nos. 4,961,790 and 5,783,541, and other exemplary surface-treatments and encapsulation designs are described in Rodriguez, E. et al. (2009, Society of Petroleum Engineers, paper SPE 124418), and U.S. Pat. Nos. 5,373, 901; 6,444,316; 6,527,051; 6,554,071; 7,156,174; and 7,204,312, the relevant disclosures of which are incorporated herein by reference.

Submicron particles used in the methods and embodiments disclosed herein for well stimulation and oil recovery operations can additionally comprise mesoporous materials. Mesoporous materials are highly structured porous materials having a pore size in the range of 2-50 nm. They have large specific surface areas, perhaps in excess of 500 m$^2$/g, or even in excess of 1000 m$^2$/g. When in particulate form, mesoporous materials have particle sizes in the range of hundreds of nanometers.

Mesoporous materials are, however, not nanoparticles, but rather nanomaterials. Although their pore sizes are in the 2-50 nm range—which is what makes mesoporous materials nanomaterials—mesoporous particles typically have particle diameters in the submicron and even micron range. Occasionally, however, mesoporous materials are referred to as mesoporous nanoparticles. Because they are porous materials, mesoporous materials are defined physically above all by their pore size, and functionally most basically by their specific surface area.

Mesoporous materials are synthesized by surfactant- or non-surfactant directed templating methods. These methods can be described as combining aspects of the sol-gel process and template-directed synthesis. A traditional synthetic route starts from a highly concentrated surfactant dispersion where surfactant molecules form not only micelles, but higher order-structured micelle clusters that are tube-like with (hexagonal) channels, the surfactant dispersion being a form of liquid crystal. Then silicate or aluminosilicate precursors in the form of tetraethyl orthosilicate (TEOS) or the like are introduced, which react within or surrounding the hexagonal framework supplied by the surfactant clusters. In subsequent steps the surfactants are removed, leaving a regularly ordered network of silicate or aluminosilicate material with nano-sized pores. Early examples of mesoporous materials are silica solids MCM-41, MCM-48, and others in the so called M41S family of materials. Art references describing the synthetic process for and other aspects of mesoporous materials include Hoffman et al., 2006, Angew. Chem. Int. Ed., vol. 45, 3216-3251; Perego C. and Millini. R, 2013, Chem. Soc. Rev., advanced article, DOI: 10.1039/C2CS35244C; and Alothman, Z., 2012, Materials, vol. 5, 2874-2902.

Oil recovery tests from limestone cores were conducted using procedures similar to those in Examples 1, 2, and 4 below, using mesoporous aluminosilicate materials with specific surface areas of greater than (>) 700 m$^2$/g and 940 m$^2$/g respectively by BET methods and particle size in the 100-500 nm range incorporated into a commercial surfactant product StimMax C (mesoporous material particle concentration 0.008 wt %). Oil recovery rates were between six and nine times more compared to controls using the surfactant product only. These results demonstrate that mesoporous particles in the submicron range, between about 100 nm and 600 nm, and having a specific surface area larger than 500 m$^2$/g are suitable for use in the processes and methods disclosed herein.

Mesoporous particles due to their large specific surface area are strongly adsorbed onto surfaces, therefore can potentially lead to plugging. However, being selective on the type of mesoporous particles used, and introducing other steps, can ameliorate this effect. As an example, MCM-41 is known to be the least mechanically stable mesoporous material compared to, e.g., other porous silicas, silica gels or zeolites, so will be a good choice for processes described herein. Another solution is to perform a flush. The combination of using a non-mechanically stable mesoporous material and a spacer injection can allow practitioners to take advantage of the good oil recovery powers of this class of materials, while avoiding or minimizing a potentially undesirable side effect of their use.

Those skilled in the art will recognize that modifications and variations can be made to the above disclosure without departing from the spirit of the present disclosure. Therefore, it is intended that this disclosure encompass all such variations and modifications as fall within the scope of the current disclosure, and the appended claims. Further, it is intended that the appended claims do not limit the scope of the above disclosure, and can be amended to include features hereby provided for within the present disclosure.

EXAMPLES

In the following examples, all oil recovery tests make use of Texas cream limestone cores with the following parameters: 5.13×2.53 cm (length×diameter); 51.2 gram dray weight; mean pore size 4 μm, gas permeability 21.4 mD, and porosity~24%.

Example 1

To determine the effect of submicron particles on existing surfactant based stimulation and EOR treatment fluids, laboratory tests were performed as follows: a) two limestone cores (characteristics provided above) were completely saturated under vacuum with a light crude oil from a production well in the Eagle Ford Shale, 38 degrees API gravity, and the weight of oil imbibed measured (usually in a range of 5-5.5 grams); b) one core was immersed into a dispersion containing 0.2 wt % RC27, a commercial surfactant formulation used in oilfields, with 2 wt % potassium chloride (KCl) as brine base, while the second core was immersed into a dispersion that contained the same concentration of surfactant product and brine, and also additionally 0.004 wt % silica submicron particles having a particle size of 200-300 nm range and a specific surface area of 200 m$^2$/g; c) each core was placed in a separate Amott cell, which is a device that includes a volumetric burette attached to the top of a vessel to collect all of the crude oil expelled and recovered from the cores, and placed into an 80 C oven; and d) the cumulative volume of crude oil expelled and collected from each core was measured.

TABLE 1

% Oil recovery by chemical soaking of limestone cores containing a light crude oil

| Elapsed Time | Surfactant Only 0.2 wt % RC27 | Surfactant + Submicron Particles 0.2 wt % RC27, 0.004 wt % silica, 200-300 nm | Conditions |
|---|---|---|---|
| 25 min | 0 | 3.4 | 80 C. |
| 1 hour | 0 | 12 | |
| 17 hours | 20.7 | 53.2 | |

Test results are shown in Table 1 above. As can be seen, the submicron particles containing dispersion promoted greater oil recovery at all time points recorded. For this set of conditions, the recovery was more than two and a half times greater at 17 hours using the particles dispersion versus surfactant only. Notably the unobvious beneficial effect came about rapidly, as seen comparing the 1 hour time points. These results support the additional benefits brought to oil recovery processes by submicron particles, even at low concentrations, beyond those of surfactants.

Example 2

The effect of submicron particles on oil recovery processes was further explored. These tests used the same testing procedure as those in Example 1. The oil used in these tests was a medium gravity crude oil from a carbonate reservoir of the West Texas Permian Basin. The surfactant was StimMax C, a commercial surfactant product used in oilfield applications. Two types of submicron particles were used: lanthanum gallate (size 300-600 nm, specific surface area 4-8 m$^2$/g) and silica (size 200-300 nm, specific surface area 200 m$^2$/g). Other differences in conditions and parameters are noted in Table 2 immediately below.

nm particles. The 200-300 nm particles provided more than 3 times the level of oil expelled over 18 hours versus using the surfactant product alone. Of particular note is the fact both particles were highly polydisperse. The particles only control did not provide any oil recovery, showing that particles are effective in providing extra recovery only when incorporated into a surfactant system.

It is pertinent to compare the characteristics of the cores used in these tests versus those from Alaskar et al. reference cited earlier (2012, Society of Petroleum Engineers, paper SPE 146752). Alaskar et al. used berea sandstone cores (mean pore size 10 μm, gas permeability~152 mD, and porosity~18%), while present tests used Texas cream limestone cores (mean pore size 4 μm, gas permeability 21.4 mD, and porosity~24%). The present tests demonstrate that submicron particles up to 600 nm were able to be transported through cores of smaller pore size, significantly lower permeability, and slightly larger porosity than those from the art reference, which specifically provided an opposing teaching, that particles greater than 200 nm could not be so transported.

These results confirm and expand those from Example 1, demonstrating that submicron particles within a large size or specific surface area range, of a highly polydisperse type, and capable of being incorporated into different commercial surfactant products are unexpectedly effective in oil stimulation and recovery processes, directly contrary to teachings by prior art.

Example 3

In an experiment the dewatering performance of dispersions containing a surfactant formulation alone or also additionally submicron particles were evaluated. Limestone cores were soaked until they were saturated with a base brine of 2 wt % KCl. Then in the presence of the dispersions they were centrifuged at a series of increasing speeds, and the percentage of brine removed recorded. The surfactant chosen was a commercial formulation called 250G, and it was made at 0.1 wt % of total dispersion. The submicron particles were silicon oxide 200-300 nm in particle size, 200 m$^2$/g in specific surface area, made at 0.004 wt % of total dispersion.

The results, shown in FIG. 1, demonstrate the superior performance of the dispersion containing 0.004 wt % submicron particles. It performed better than the surfactant only dispersion, removing 6-10% more brine at every centrifugation speed.

Surfactant dispersions generally promote removal of water and aqueous-based fluids due to their ability to

TABLE 2

% Oil recovery by chemical soaking of limestone cores containing a West Texas medium gravity crude oil

| Surfactant Only 0.2 wt % StimMax C | Particles Only 0.008 wt % particles | Surfactant + Particles 0.2 wt % StimMax C, 0.008 wt % particles | Submicron Particle Type | Conditions |
|---|---|---|---|---|
| 12.9 | 0 | 32.5 | Lanthanum gallate, 300-600 nm | 50 C., 64 hours |
| 9.5 | 0 | 32 | Silica, 200-300 nm | 50 C., 18 hours |

Results for these further tests, listed in Table 2 above, show that both submicron particles were effective in promoting extra oil recovery when incorporated into a commercial surfactant product. The 300-600 nm particles had smaller specific surface areas and took longer to provide about the same level of extra oil recovery as did the 200-300 decrease the interfacial tension among fluid components (and also components that exist in different phases), and they can also change the surfaces of the rock to be more neutral. These physical effects decrease the force required to push the aqueous fluid through and out of the porous media. The addition of small particles in the submicron range of a polydisperse type, at very low concentrations, surprisingly enhances this performance effect. The results support a conclusion that submicron particles are advantageous additives in flow back applications.

Although dewatering is a distinct performance criterion from oil recovery, it provides an important supportive function in oil recovery operations. The dewatering improvement observed is evidence that methods disclosed herein provide an extra beneficial effect in oil recovery processes, such as leading to a speedier return of fracturing fluids, allowing the hydrocarbon production that follows to have a higher oil-to-water ratio.

Example 4

Tests were run to determine if any beneficial effects to oil recovery can result from mixing a surfactant EOR system with an acid treatment solution. Such a chemically mixed system can occur in situ in the processes and embodiments disclosed herein. These tests used the same testing procedure as for those in Example 2, and all species and conditions were the same except as noted below. Results are shown in Table 3 below.

TABLE 3

A 3-way comparison of % oil recovery by chemical soaking of cores containing a West Texas medium crude

| % Oil Recovered | | | | |
|---|---|---|---|---|
| A | B | C | Particle Type | Conditions |
| 11.2 | 9.9 | 20.4 | Lanthanum gallate, 300-600 nm | 60 C., 12 hours |
| 6 | 9.9 | 13.1 | Silica, 200-300 nm | 60 C., 12 hours |

Explanations:
A: Submicron particles surfactant dispersion only: 0.2 wt % StimMax C, 0.008 wt % submicron particles.
B: Acid only: 0.25 wt % HCl.
C: Dispersion plus acid: 0.2 wt % StimMax C, 0.008 wt % submicron particles, 0.25 wt % HCl.
* The starting amount of oil soaked into the limestone cores ranged between 4.31 to 4.42 grams.

Measurements in Table 3 demonstrate the non-obvious result that oil recovery is surprisingly greater for the combination of particles surfactant dispersion and acid solution together than when either treatment fluid was used alone. This extra effect is more pronounced in the case of the 300-600 nm lanthanum gallate particles, providing about twice the oil recovery compared to the dispersion product used alone or the acid used alone at 12 hours. The two treatment process fluids can work better together by improving penetration of the mixture fluid's dissolving effect on the porous matrix. The results also demonstrate that an acid solution combined with a submicron particles surfactant dispersion will recover oil effectively if such a mixture is injected into an injection well.

Example 5

The effect of urea on a submicron particles surfactant dispersion was studied.

A particular dispersion formulation comprises a mixture of nonionic ethoxylated surfactants having a total concentration of approximately 24 wt %, and including also 0.75 wt % of submicron particles (200-300 nm). Variations of this dispersion were made. It was observed that for samples in the case wherein the remainder of the dispersion is water, in a test tube containing the formulation there accumulated within 5 days a viscous solid/fluid mixture at the bottom of the tube. In samples wherein just 15 wt % of the water was substituted with urea, observable separation was prevented for in excess of four months.

This result supports the surprising use of urea as an effective agent in small particles wettability-altering dispersion compositions to prevent the small particles from settling out of dispersion due to gravity separation.

Example 6

Hydrochloric acid solutions are used frequently in well stimulation treatments of oil and gas production wells. They are often employed to dissolve bothersome scale deposits, such as calcium carbonate. One issue relevant to the present disclosure is if the particles surfactant treatment process is combined with the usual acid treatment solution, will the fluids used be compatible?

To determine whether a submicron particles surfactant dispersion suitable for stimulation or EOR processes according to embodiments in the present disclosure is compatible with an acid solution used in well stimulations, the following experiment was run.

A comparison in dispersion appearance of the following at room temperature was made:
2 wt % KCl brine
2 wt % KCl brine+1.0 wt % HCl
2 wt % KCl brine+1.0 wt % HCl+0.2 wt % StimMax C+2.0 wt % 200-300 nm silica particles All of these solutions remained clear throughout the 10 days of observation. This example shows that a compatible, stable mixture comprising a commonly used brine solution containing hydrochloric acid, and a submicron particles surfactant dispersion, can be used for the stimulation and improved oil recovery processes described herein.

What is claimed is:

1. A method of stimulating a well comprising:
   i) forming a stimulation fluid comprising: at least one surfactant; and submicron fumed silica particles having a particle size greater than 200 nm and up to 800 nm and a specific surface area greater than about 5 square meters per gram, wherein the stimulation fluid changes a wettability of a reservoir matrix, and wherein the submicron fumed silica particles contributes to said change; and
   ii) introducing the stimulation fluid into a wellbore in contact with the reservoir matrix,
   whereby the well is stimulated to improve its hydrocarbon production due in part to the wettability change.

2. The method of claim 1, wherein the stimulation fluid is defined by properties comprising at least one of the following features:
   (a) the ability to lower an oil and water interfacial tension between oil and water in the reservoir;
   (b) the ability to enhance a mobility or a spreading of hydrocarbons out of the porous matrix portion of the reservoir; or
   (c) the ability to enhance compatibility with chemicals in other well treatment processes that can be performed on the well.

3. The method of claim 1, wherein the surfactant is selected from the group consisting of ethoxylated alkylphenols, ethoxysulfate alkylphenols, ethoxylated alcohols, ethoxysulfate alcohols, ethoxylated amines, ethoxylated amides, alpha olefin sulfonates, internal olefin sulfonates, alkyl aryl sulfonates, petroleum sulfonates, propoxylated ethoxylated alcohols, propoxylated ethoxylated sulfates, propoxylated ethoxylated sulfonates, propoxylated ethoxylated amines, propoxylated ethoxylated amides, alkyl polyglycosides, amine salts, ammonium salts, and mixtures thereof, including primary amines.

4. The method of claim 1, wherein the well is in fluid communication with a subterranean formation comprising a fractured reservoir.

5. The method of claim 1, further comprising introducing a hydraulic fracturing compound into the well to synthetically fracture a reservoir that is in fluid communication with the well, either simultaneously or in sequence with introducing the stimulation fluid.

6. The method of claim 1, wherein the stimulation fluid further comprises urea.

7. The method of claim 1, wherein the introducing step is modified by first combining the submicron fumed silica particles with dry treatment additives to be introduced into the well to fashion a dry mixture, such that when said mixture meets any of a second fluid that is separately introduced, the second fluid being a diluent of the surfactant, the surfactant, or a treatment fluid distinct from the stimulation fluid, the stimulation fluid is provided and introduced.

8. The method of claim 1, wherein the surfactant comprises a biosurfactant.

9. The method of claim 8, wherein the biosurfactant comprises a glycolipid or a lipopeptide.

10. The method of claim 1, wherein the fumed silica particles have a particle size distribution in the range of between 200 nm to 300 nm and a specific surface area of approximately 200 square meters per gram.

11. A method to enhance oil recovery from a subterranean reservoir, the reservoir being accessible via a well, the method comprising:
    injecting a treatment fluid comprising submicron fumed silica particles and at least one surfactant into the well, wherein the submicron fumed silica particles have a particle size greater than 200 nm and up to 800 nm and a specific surface area greater than about 5 square meters per gram, wherein the treatment fluid changes a wettability of a reservoir matrix, and wherein the submicron fumed silica particles contribute to said change; and
    injecting a well-servicing volumetric solution into the well to perform a second well treatment process, wherein the second well treatment process is selected from the group consisting of a scale inhibition squeeze process, a well acidizing process, a chemical process to reduce water production rate, an acid fracturing process, and a hydraulic fracturing process,
    wherein the treatment fluid and the well-servicing volumetric solution are injected into the well within less than about 21 days of one another.

12. The method of claim 11, wherein the submicron fumed silica particles have a particle size greater than 200 nm and up to 300 nm.

13. The method of claim 11, wherein the submicron fumed silica particles have a specific surface area greater than about 150 square meters per gram.

14. The method of claim 11, wherein the treatment fluid is defined by properties comprising at least one of the following features:
    (a) the ability to lower an oil and water interfacial tension between oil and water in the reservoir;
    (b) the ability to enhance a mobility or a spreading of hydrocarbons out of the porous matrix portion of the reservoir; or
    (c) the ability to enhance compatibility with chemicals in the second well treatment process.

15. The method of claim 11, wherein the surfactant is selected from the group consisting of ethoxylated alkylphenols, ethoxysulfate alkylphenols, ethoxylated alcohols, ethoxysulfate alcohols, ethoxylated amines, ethoxylated amides, alpha olefin sulfonates, internal olefin sulfonates, alkyl aryl sulfonates, petroleum sulfonates, propoxylated ethoxylated alcohols, propoxylated ethoxylated sulfates, propoxylated ethoxylated sulfonates, propoxylated ethoxylated amines, propoxylated ethoxylated amides, alkyl polyglycosides, amine salts, ammonium salts, and mixtures thereof, including primary amines.

16. The method of claim 11, wherein the subterranean formation is a fractured reservoir.

17. The method of claim 11, further comprising introducing a hydraulic fracturing compound into the well to synthetically fracture the reservoir, either simultaneously or in sequence with introducing the treatment fluid.

18. The method of claim 11, wherein the treatment fluid further comprises urea.

19. The method of claim 11, further comprising, prior to injecting the treatment fluid, combining the submicron fumed silica particles with dry treatment additives to be introduced into the well to fashion a dry mixture, such that when said mixture meets any of a fluid that is separately introduced, the fluid being a diluent of the surfactant, the surfactant, the second well treatment solution, or a treatment fluid distinct from either the treatment fluid or the second well treatment solution, the treatment fluid is formed.

20. The method of claim 11, wherein the surfactant comprises a biosurfactant.

21. The method of claim 20, wherein the biosurfactant comprises a glycolipid or a lipopeptide.

22. The method of claim 11, wherein the submicron fumed silica particles are present in the treatment fluid in an amount in a range of from about 0.00004% to about 0.1% by weight based on the total weight of the treatment fluid.

23. The method of claim 11, wherein the submicron fumed silica particles are present in a pre-diluted dispersion in an amount in a range of from about 0.1% to about 30% by weight based on the total weight of said pre-diluted dispersion.

24. The method of claim 11, further comprising injecting a spacer slug comprising fresh water brine and a hydrocarbon.

25. The method of claim 11, further comprising adding to the well-servicing volumetric solution at least one of a portion of the treatment fluid, or a second surfactant selected to increase the oil-to-water ratio of oil recovery from the porous matrix portion of the reservoir.

26. The method of claim 11, further comprising:
    (a) halting fluid production from the well;
    (b) simultaneously injecting the well-servicing volumetric solution and the treatment fluid into the well;
    (c) shutting in the well for a soaking period of time; and
    (d) returning the well to production to recover additional oil from the reservoir.

27. The method of claim 26, further comprising, between steps (b) and (c), injecting a spacer slug of inert fluid into either a production or injection well.

28. The method of claim 11, wherein the treatment fluid and the well-servicing volumetric solution are injected into the well within less than about thirty days of one another.

29. A method to enhance oil recovery from a subterranean reservoir, the reservoir being accessible via a well, the method comprising:
    forming an EOR injection fluid comprising submicron fumed silica particles and at least one surfactant into the well, wherein the submicron fumed silica particles have a particle size greater than 200 nm and up to 800 nm and a specific surface area greater than about 5 square meters per gram, wherein the EOR injection fluid changes a wettability of a reservoir matrix, and wherein the submicron fumed silica particles contribute to said change; and introducing the EOR injection fluid into the reservoir via the well, whereby hydrocarbon production from the reservoir is enhanced due in part to the wettability change.

* * * * *